United States Patent [19]

Barton

[11] 4,227,978

[45] Oct. 14, 1980

[54] PHOTOHARDENABLE COMPOSITION

[75] Inventor: Robert W. Barton, Cottage Grove, Minn.

[73] Assignee: Minnesota Mining and Manufacturing Company, Saint Paul, Minn.

[21] Appl. No.: 52,418

[22] Filed: Jun. 27, 1979

[51] Int. Cl.$^2$ ............................ C08F 2/50; C08F 2/54; C08F 4/00
[52] U.S. Cl. .......................... 204/159.12; 204/159.15; 204/159.16; 204/159.17; 204/159.18; 204/159.19; 430/285; 430/286; 430/325
[58] Field of Search ...................... 204/159.15, 159.18, 204/159.19, 159.17; 430/285, 325

[56] References Cited

U.S. PATENT DOCUMENTS

| | | | |
|---|---|---|---|
| 4,069,055 | 1/1978 | Crivello | 204/159.18 |
| 4,085,018 | 4/1978 | Ariga et al. | 204/159.15 |
| 4,090,936 | 5/1978 | Barton | 204/159.18 |
| 4,134,811 | 1/1979 | DePoortere | 204/159.15 |
| 4,134,814 | 1/1979 | DePoortere | 204/159.15 |

*Primary Examiner*—Walter C. Danison
*Attorney, Agent, or Firm*—Cruzan Alexander; Donald M. Sell; Dean P. Edmundson

[57] ABSTRACT

Photohardenable compositions are described comprising a halogenated oligomeric ester, acrylate or methacrylate monomer compatible with the ester, free-radical generating initiator, epoxide, and cationic initiator. The compositions are particularly useful as plating and etching resists.

17 Claims, No Drawings

PHOTOHARDENABLE COMPOSITION

BACKGROUND OF THE INVENTION

This invention relates to photohardenable compositions. More particularly, this invention relates to liquid compositions which are suitable for use as photoresists.

Various types of plating and etching resists have been known and used for many years for various applications (e.g. in making of printed circuitry, printing plates, etc.). Some types of resists are solvent-based and are hardened or solidified after being coated in the desired pattern by driving off the solvent (e.g. with heat). Some other types of resists are light sensitive and are hardened or solidified by exposure to light after coating, whereupon the resist crosslinks or polymerizes to an insoluble state which is not easily removable with conventional solvents.

Although conventional solvent-based resists provide patterns which can later be removed with solvent after the desired plating or etching has been completed, such resists are undesirable by reason of the fact that in the initial formation of the resist pattern, solvent must be removed. The pollution problems attendant with such procedure (i.e. removal of solvent), and the time required to obtain a hardened pattern, are inherent limitations associated with the use of such solvent-based resins.

In many applications it is extremely desirable (and in some cases it is necessary) to be able to remove the resist pattern rapidly and efficiently from a substrate with conventional organic solvent after the required etching or plating of the substrate has been completed. This is particularly true when the etched substrate is passed through a series of baths in which organic solvent flows continuously from the latter baths toward the first bath. Here it is important that the resist be removed in the first bath.

U.S. Pat. No. 4,134,811 (De Poortere et al.) disclose halogenated photopolymerizable compositions which do not present the problem relating to solvent evaporation. However, these materials, when applied to copper or aluminum substrates, are best removed with alkaline solution and are removed only very slowly with conventional organic solvents (i.e. methylene chloride).

U.S. Pat. No. 4,090,936 (Barton) describes photohardenable, liquid compositions useful as photoresists. While these materials, when cured, retain suitable adhesion to substrates and are rapidly removed when exposed to conventional solvents, the present invention represents an improvement over the high temperature performance of these compositions.

THE PRESENT INVENTION

The present invention provides novel photohardenable compositions comprising:

(a) about 10–80 weight percent of a halogenated oligomer having a molecular weight of less than about 10,000 and a content of halogen attached to carbon of an $sp^2$ configuration of 19 to 55 weight percent;

(b) about 10–80 weight percent of an acrylate or methacrylate monomer compatible with (a);

(c) about 0.2–10 weight percent of a free radical generating initiator activatable by actinic light or electron beam irradiation;

(d) about 2–20 by weight of a compound or mixture of compounds having an "average" epoxide functionality of about 1 to 1.8;

(e) about 1–10 weight percent of a cationic initiator activatable by actinic light or electron beam irradiation.

The compositions are particularly useful as photoresists in, for example, the making of printed circuitry and may be readily photohardenable by exposure to actinic radiation or by exposure to electron beam irradiation. After the required etching or plating of the substrate has been completed, the resist pattern may be easily removed with solvent (e.g. methylene chloride).

The photohardenable compositions of the invention overcome the disadvantages of previously known compositions. For example, the compositions of the invention are one-part, compositions and are photohardenable to tack-free state even at room temperature or below. The hardened material has good adhesion to metal and other surfaces and good resistance to etching and plating chemicals as well as to abrasion. These materials have suitable high temperature performance and are not easily marred when carried on conventional carrier belts during processing of the substrate. Also, the cured materials rapidly break up in the form of particles (that is disaggregate) when exposed to conventional organic solvents, which particles sink in the solvent bath thereby further reducing the possibility of contamination of other substrates. Furthermore, the solventless, liquid compositions of the invention are 100% solids and accordingly obviate the problems and disadvantages associated with the use of solvent-based compositions, and use of these materials result in minimization of energy consumption and pollution. Because preferred compositions of the invention are liquids (having a viscosity, for example, in the range of 40,000–50,000 cps at 25° C.) they can be easily screen printed onto the desired substrate.

DETAILED DESCRIPTION OF THE INVENTION

Photohardenable compositions of the present invention comprise between about 10 and 80 weight percent of a halogenated oligomeric ester (preferably about 35 to 65 weight percent). Incorporation of a halogenated oligomeric ester into the photohardenable composition of the invention results in cured materials which have suitable hardness and which disaggregate in the form of particles when exposed to conventional solvents (i.e. methylene chloride). Halogenated oligomeric esters useful in the compositions of the invention have a molecular weight of less than about 10,000 and a content of halogen attached to carbon having $sp^2$ electronic configuration of between about 19 and 55 weight percent.

Depending on how the compositions of the present invention are applied to the desired substrates, viscosity of the final photohardenable composition may or may not be an important fact to consider. For example, if the composition is to be rollprinted onto an appropriate substrate, more viscous compositions may be used (e.g. having a viscosity in the range of 50,000 to 200,000 centipoises). Thus, the halogenated oligomeric ester, which is a major component of the system, could be of very high molecular weight. However, if the composition is to be used as a screen-printable resist, viscosity of the composition is an important characteristic to be considered. In this situation, the preferred molecular weight of the halogenated oligomeric ester is less than 10,000. Otherwise, the photohardenable composition will be so viscous as to prevent easy passage of the material through the openings in the screen. Also, more viscous compositions tend to have a tackiness which prevents easy removal of the screen from the substrate subsequent to screening. Finally, viscous compositions have the disadvantageous tendency to entrap air as the composition is forced through the openings in the screen.

As far as content of halogen attached to $sp^2$ hybridized carbon is concerned, compositions comprising oligomeric ester which contains less than about 19 weight percent halogen tend to have poor adhesion to substrates upon curing. When halogen content of the oligomeric ester exceeds about 55 weight percent, the cured material has a greater tendency to form films upon attack by methylene chloride.

While the halogen substituents could theoretically represent any of the halogens, economics and availability dictate the use of chlorine and bromine. In particular, when chlorine is the only halogen substituent, the oligomeric ester should contain about 19 to 44 weight percent and preferably about 25 to 44 weight percent of chlorine attached to $sp^2$ hybridized carbon. It is preferred that oligomeric esters used in the present invention not contain bromine as the only halogen substituent, but the esters may contain both bromine and chlorine substituents. Use of esters have only bromine substitution results in compositions which upon curing do not exhibit suitable hardness. Thus, when both chlorine and bromine are used as halogen substituents, the oligomeric ester should contain from about 19 to 55 weight percent, and preferably about 25 to 53 weight percent, of halogen attached to $sp^2$ hybridized carbon.

It is important that the halogen be primarily bound to carbon having an $sp^2$ electronic configuration. This results in photohardenable compositions which cure more quickly in the presence of oxygen, presumably as a result of halogen free-radicals being produced.

As far as particular halogenated oligomeric esters are concerned, U.S. Pat. No. 4,134,811 (De Poortere, et. al.), incorporated herein by reference, lists a series of halogenated and nonhalogenated carboxylic acid components and alcohol components which can be used in synthesizing oligomeric esters containing halogen bonded to carbon of an $sp^2$ configuration. Furthermore, use of compounds disclosed in U.S. Pat. No. 4,134,811 results in oligomeric esters which may or may not have polymerizable unsaturation.

Preference is given in the present invention to use of simple dicarboxylic acids (including functional derivatives thereof) and low molecular weight glycols in preparing suitable esters. Furthermore, preference is given in the present invention to those oligomeric esters which do not contain polymerizable unsaturation. Otherwise, extensive crosslinking would result in a photohardenable composition which, upon curing, would have less tendency to disaggregate in the form of particles when exposed to conventional solvent in the development process.

Suitable halogenated dicarboxylic acids and anhydrides for use in preparing the esters used in the present invention include halogenated phthalic acid derivatives such as tetrachlorophthalic anhydride, hexachloroendomethylene tetrahydrophthalic anhydride, tetrabromophthalic anhydride, and various mixtures thereof.

Suitable nonhalogenated dicarboxylic acids for use in preparing the esters used in the present invention include phthalic anhydride, adipic acid, sebacic acid and azelaic acid. Benzoic acid can be used in order to control the molecular weight of the resulting oligomeric ester.

Suitable alcohols for use in the present invention include various low molecular weight glycols such as ethylene glycol, diethylene glycol, propylene glycol, dipropylene glycol, neopentyl glycol, tripropylene glycol, triethylene glycol, tetraethylene glycol, and the like. A mixture comprising ethylene glycol in molar excess to diethylene glycol is particularly suitable.

Among the halogenated oligomeric esters which can be used in the photohardenable compositions of the invention, "Ebecryl" 584, commercially available from UCB (Belgium), is suitable. "Ebecryl" 584 is described as a 60% (by weight) solution of a polyester acrylate in 1,6-hexanediol acrylate. This polyester acrylate is believed to have a molecular weight of about 3,000, and it comprises tetrachlorophthalic acid, orthophthalic acid, adipic acid, diethylene glycol and ethylene glycol residues.

For the mode of preparation of halogenated polyesters, reference is made to Kirk-Othmer, Encyclopedia of Chemical Technology, 2nd Edition, Loc. Cit., Vol. 16, pp 159-189, incorporated herein by reference. However, to prepare the halogenated oligomeric esters preferred in this invention, the following method may be used.

In a 3-neck round bottom flask equipped with a mechanical stirrer, a dipping thermometer and a Barrett trap with condensor, the Barrett trap containing cyclohexane, there are placed the alcohols, followed by the acids or anhydrides with stirring. The mixture is heated to 100°-130° C., while stirring, at which point the mixture becomes clear. Cyclohexane is used as an entraining solvent for the water produced during the esterification. Care must be taken when adding the cyclohexane so as not to depress the reaction temperature below about 100° C. As the reaction proceeds, the temperature is allowed to slowly increase to 140°-150° C. Complete reaction is not particularly advantageous and is in fact difficult to achieve. An 85-90% reaction, typically achievable within 3½ to 16 hours, is suitable for preparing an oligomer for use in this invention. Reaction times, however, will vary according to reactants used. Upon termination of the reaction, residual cyclohexane is removed from the hot solution under vacuum with stirring being maintained.

The clear, mobile product is decanted while the mixture is still hot. Products are very viscous and glass-like upon cooling and therefore, for purposes of preparing the preferred photohardenable compositions of this invention, a 60% solution of the oligomeric ester in 1,6-hexanediol diacrylate, or some other compatible acrylate or methacrylate monomer, is prepared with agitation.

Photohardenable compositions of the present invention comprise a monomeric acrylate or methacrylate in order to form a crosslinking network in the cured composition. This provides a matrix for the nonpolymerizable components of the composition upon photohardening of the composition.

The amount of acrylate or methacrylate monomer included in the compositions of the present invention is generally in the range of about 10 to 80 weight percent of the total composition, and when using the preferred diacrylates or dimethacrylates, the preferred range is between about 20 and 37 weight percent of the total composition. Use of larger amounts causes excessive crosslinking and attendant poor adhesion of the cured materials to substrates. Furthermore, excessively crosslinked cured material is less likely to disaggregate as particles when exposed to methylene chloride. On the other hand, when the percentage of monomer is below about 10 weight percent of the total composition, the rate of polymerization is so slow as to result in compositions not suitable for commercial applications.

Volatility of various acrylates is an important factor to be considered in relation to possible unpleasant odors and toxicity. Thus preference is given to those compounds possessing boiling points above 100° C.

Diacrylates and dimethacrylates are preferred in the present invention as the acrylate or methacrylate monomeric component, though mixtures comprising other acrylates or methacrylates are suitable provided they contain at least about 80 weight percent of difunctional monomer. Excessive amounts of triacrylates and higher functional monomers (i.e. greater than about 20% of the acrylate or methacrylate mixture) results in compositions which are brittle upon curing. Similarly, inclusion of an excessive amount of monoacrylate results in cured material which has a greater tendency to be removed from a substrate as a film upon exposure to methylene chloride.

Commercially available diacrylates and dimethacrylates suitable for use in the present invention include 1,6-hexanediol diacrylate, tetraethylene glycol diacrylate, 1,4-butanediol diacrylate, 1,4-butanediol dimethacrylate, diethylene glycol diacrylate, diethylene glycol dimethacrylate, ethylene glycol diacrylate, ethylene glycol dimethacrylate, neopentyl acrylate, and the like.

Commercially available monoacrylates and monomethacrylates suitable for use in the present invention include butylacrylate, isobutylacrylate, butylmethacrylate, glycidylacrylate, glycidylmethacrylate, isobornylacrylate, cyclohexyl acrylate, phenyl acrylate, tertiary-butylacrylate and the like.

Commercially available triacrylates and trimethacrylates include pentaerythritol triacrylate, trimethylol propane triacrylate, glycerol triacrylate, and the like.

Photohardenable compositions of the present invention comprise about 0.2–10 weight percent of a free radical generating initiator. Preferred free radical generating initiators used in the present invention are those activatable by actinic light or electron beam irradiation and which are thermally inactive below about 185° C.

Presence of such an initiator greatly facilitates curing of the photohardenable composition. It should be noted, at this point, that compositions not containing a free radical generating initiator have a tendency to polymerize, but only very slowly, when exposed to actinic light. This polymerization is probably attributable to the presence of halogen substituted aromatic residues in the halogenated oligomeric ester which generate free radicals on exposure to light.

The most preferred initiator is 2,2-dimethoxy-2-phenylacetophenone (e.g. "Irgacure" 651, commercially available from Ciba-Geigy). Other preferred initiators include diethoxyacetophenone, 2-chlorothioxanthone, fluorescein, benzophenone, benzoin ethers such as benzoin methylether and benzoin ethylether, and substituted or unsubstituted polynuclear quinones such as t-butyl anthraquinone. Other suitable free radical initiators include those mentioned in U.S. Pat. No. 3,953,214 (Lipson), incorporated herein by reference.

Surprisingly, inclusion of an epoxide in the compositions of the present invention results in cured material which exhibits suitable adhesion to substrates and which can be rapidly removed from substrates with methylene chloride. Therefore, the compositions of the invention also include an epoxide (or mixture of epoxides) in an amount of from about 2–20 weight percent of the total composition. If the composition is to be screen printed, it has been found that the epoxide component should not exceed about 15 weight percent of the total composition; otherwise the composition has a tendency to gel thereby rendering it unscreenable.

Epoxy-containing materials useful in the compositions of the invention are any organic compounds having an oxirane ring

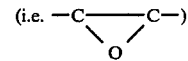

polymerizable by ring opening. Such materials, broadly called epoxides, include monomeric epoxy compounds and epoxides of the polymeric type and can be aliphatic, cycloaliphatic, aromatic or heterocyclic. However, in terms of compositions suitable for screen printing, monomeric epoxides are the preferred material. Again, use of high molecular weight polymeric epoxides would increase viscosity of the complete system.

Preference is given in the present invention to epoxides or mixtures of epoxides having an "average" epoxide functionality of about 0.1 to 1.8. The "average" number of epoxy groups per molecule is determined by dividing the total number of epoxy groups in the epoxy-containing material by the total number of epoxy molecules present. If an "average" epoxide functionality of 1.8 is exceeded, the resulting composition tends to exhibit poor adhesion to substrates upon curing.

Useful epoxy-containing materials include those which contain cyclohexene oxide groups such as the epoxy-cyclohexanecarboxylates, typified by 3,4-epoxycyclohexylmethyl-3,4-epoxycyclohexane carboxylate, 3,4-epoxy-2-methylcyclohexylmethyl-3,4-epoxy-2-methylcyclohexane carboxylate, and bis(3,4-epoxycyclohexylmethyl)adipate. For a more detailed list of useful epoxides of this nature, reference is made to U.S. Pat. No. 3,117,099, incorporated herein by reference.

Further epoxy-containing materials which are useful in the practice of this invention include glycidyl ethers of the formula

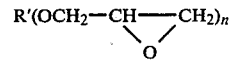

where R' is alkyl or aryl (e.g. phenyl, substituted phenyl) and n is an integer of 1 to 6. Examples are the glycidyl ethers of polyhydric phenols obtained by reacting a polyhydric phenol with an excess of chlorohydrin such as epichlorohydrin (e.g. diglycidyl ether of 2,2-bis(2,3-epoxypropoxyphenol)propane). Further examples of epoxides of this type which can be used in the practice of this invention are described in U.S. Pat. No. 3,018,262, incorporated herein by reference, and in "Handbook of Epoxy Resins" by Lee and Neville, McGraw-Hill Book Co., New York (1967).

Commercially available epoxy-containing materials which can be used in this invention include octadecylene oxide, vinylcyclohexene oxide, glycidol, glycidylmethacrylate, diglycidyl ether of Bisphenol A (e.g. those available under the trade designation "Epon 828," "Epon 1004" and "Epon 1010" from Shell Chemical Co., "DER-331," "DER-332" and "DER-334;" (from Dow Chemical Co.), glycidyl ether of p-tertiarybutylphenol (e.g. those available under the trade designation "Epi-Rez" 5014 (from Celanese), cresyl glydicyl ether (e.g., "Epi-Rez" 5011 from Celanese), 3,4-epoxycyclohexylmethyl-3,4-epoxycyclohexane carboxylate (e.g. "ERL-4221 from Union Carbide Corp.), 3,4-epoxy-6-methylcyclohexylmethyl-3,4-epoxy6-methyl-cyclohexylmethyl-3,4-epoxy-6-methylcyclohexane carboxylate (e.g. "ERL-4201" from Union Carbide Corp.), bis(3,4-epoxycyclohexylmethyl) adipate (e.g. "ERL-4299" from Union Carbide Corp.), vinylcyclohexene dioxide (e.g, "ERL-4206" from Union Carbide Corp.), bis(2,3-epoxycyclopentyl)ether (e.g. "ERL-0400" from Union Carbide Corp.), 2-(3,4-epoxycyclohexyl-5,5-spiro-34-epoxy)cyclohexane-metadioxane (e.g., "ERL-4234" from Union Carbide Corp.) and resorcinol diglycidyl ether (e.g. "Kopoxite" from Koppers Company, Inc.).

Other useful epoxy-containing materials are well known and include such epoxides as epichlorohydrins, e.g. epichlorohydrin; alkylene oxides, e.g. propylene oxide, styrene oxide; alkenyl oxides, e.g. butadiene oxide; glycidyl esters, e.g. ethyl glycidate.

Cationic initiators useful in photohardenable compositions comprising epoxides are well known in the art. For example, U.S. Pat. Nos. 4,069,054 (Smith), 4,101,513 (Fox et. al.) and pending application Ser. No. 876,114 (Smith et. al., filed Feb. 8, 1978), incorporated herein by reference, describe photopolymerizable compositions which comprise various aromatic onium salts, all of which would be suitable as cationic initiators for use in the present invention. The preferred range for the cationic initiator is between about 1 and 10 weight percent and preferably between about 2 and 4 weight percent of the total composition.

Particularly preferred initiators include the aromatic sulfonium compounds such as $\phi S\phi S(\phi)_2 SbF_6$, (where $\phi$=phenyl), triphenylsulfonium hexafluoroantimonate, triphenylsulfonium tetrafluoroborate, triphenylsulfonium hexafluorophosphate, dimethylphenylsulfonium hexafluorophosphate, diphenyliodonium hexafluorophosphate, and the like.

Other cationic initiators such as the aromatic diazonium salts described in U.S. Pat. Nos. 3,708,296 (Schlesinger) and 3,794,576 (Watt), incorporated herein by reference, could be used in the compositions of the invention. However, a stabilizer must be added to compositions containing this type of diazonium initiator in order to obtain adequate shelf life. An additional disadvantage in the use of diazonium salts is that nitrogen evolved during polymerization may render the product unsuitable for many commercial applications.

While certain cationic initiators result in polymerization of the acrylate and methacrylate monomers of the composition, such polymerization is too slow to be commercially practical in the absence of the free radical generating initiator already discussed.

Optionally, photohardenable compositions of the present invention can comprise up to 25 percent by weight of an organic polymeric binder. It has been found that inclusion of a polymeric binder reduces the loss of adhesion to substrates by these compositions upon curing. Suitable polymeric binders are compatible with the other constituents of the composition and must be soluble in the halogenated oligomeric ester.

The limitation on the amount of organic polymeric binder included in compositions of the invention is dependent on molecular weight of the binder and is related to overall viscosity of the system. For screen-printable compositions, it is preferred that a binder of molecular weight between about 20,000 to 30,000 not exceed about 10 percent by weight of the total composition. While unsaturated copolymerizable binders could be used in compositions of the invention, preference is given to noncopolymerizable binders so as to prevent excessive crosslinking of the cured compositions.

U.S. Pat. No. 3,469,982 (Celeste), incorporated herein by reference, discloses many types of binders which would be suitable in the present invention. Particularly suitable in the invention are commonly available commercial polymethacrylates including polymethyl methacrylate (e.g. that available under the trade designation "Elvacite" 2008 from DuPont), n-butylmethacrylate/-methylmethacrylate copolymer (e.g. those available under the trade designations "Elvacite" 2013 and "B-66" from duPont and Rohm and Haas, respectively), methylmethacrylate/n-butylmethacrylate, hydroxyethylmethacrylate (e.g. that available under the trade designation "Ionac" 208 from Ionac) and methylmethacrylate/n-butylmethacrylate/glycidylmethacrylate. Other polyacrylates include polyacrylate esters as well as alpha-alkyl polyacrylate esters such as polyethyl methacrylate.

Other binders which can be used in the present invention includes various polyesters such as "Food Packaging polyester resins 49000, 49001, and 49002 (available from DuPont Corp.) and "Bostick" polyester resins (available from USM Corp.); vinylidene chloride copolymers such as vinylidene chloride/methacrylate and vinylidene chloride/vinyl acetate; cellulosic ethers such as methyl cellulose, ethyl cellulose and benzyl cellulose; cellulosic esters such as cellulose acetate, cellulose acetate succinate and cellulose acetate butyrate; polyvinyl esters such as polyvinyl acetate/acrylate copolymer, polyvinyl acetate/methacrylate copolymer and polyvinyl acetate; ethylene/vinyl acetate copolymers; polyvinyl chloride; polyvinyl chloride copolymers such as polyvinyl chloride/acetate; polyvinyl acetals such as polyvinyl butyral and polyvinyl formal; polyurethanes; and styrene/butadiene copolymers.

To prepare the photohardenable compositions of the present invention, organic polymeric binder, if used, is added to the solution of 60% halogenated oligomeric ester in 1,6-hexanediol diacrylate or other suitable acrylate or methacrylate monomer. Solution is achieved by heating to about 120°–135° C. for 2–4 hours. Several polymeric binders, e.g. polyvinyl butyral, polyvinyl formal, chlorinated polyethylene and polyvinylidene chloride, must first be solvated with a suitable volatile solvent and then combined with the halogenated oligomeric ester solution. The volatile solvent is then removed under vacuum.

After solvation of the organic polymeric binder, the mixture is cooled to about 60° C. and epoxides are added. The free radical initiator and cationic catalysts are then added with heating until complete solvation occurs.

Desirable screen printing compositions are those which have an initial viscosity of about 5,000–10,000 centipoises at room temperature, but which are then generally thickened by addition of a thixotropic agent or other suitable filler to about 40,000–50,000 centipoises.

Preferred thixotropic agents for use in the invention include fumed silicas such as "M-5 Cab-O-Sil" (available from Cabot Corp.), "Santocel" (available from Monsanto Corp.) and "R-972" (available from deGussa). Various other materials such as the aluminum, calcium and zinc salts of fatty acids are also suitable for use in the invention as thixotropic agents.

Other suitable fillers which may be used are preferably inert, inorganic and transparent to ultraviolet light and include silica, alumina, talc, barium sulfate, glass beads, glass bubbles, and the like.

It is also desirable to include flow control agents such as "Modaflow" (available from Monsanto Co.) and antifoam agents such as "Foamaster G" (available from Diamond Shamrock) in screen-printable compositions of the present invention.

Other useful fillers such as plasticizers, pigments or colorants, and thermal polymerization inhibitors may be added to the compositions of this invention, if desired. Amounts of such materials to be added are readily determinable by those skilled in the art.

Fillers (excluding antifoam agent) are dispersed into the photohardenable composition using a tri-homo mill. The antifoam agent is then added and the resulting mixture is degassed and filtered through a 25–50 micron cartridge filter.

In the following examples which will serve to illustrate the present invention, all parts are parts by weight and all percentages are given as percentages by weight, unless otherwise indicated.

EXAMPLE 1

A suitable photohardenable liquid composition is prepared using the following ingredients:

| | Parts |
|---|---|
| "Ebecryl" 584 (60% solution of "polyester/acrylate" in 1,6-hexanediol diacrylate, available from UCB, Belgium) | 38 |
| "Irgacure" 651 (photoinitiator, available from Ciba-Giegy) | 2 |
| "R-972" (thixotropic agent, available from deGussa) | 2 |
| 40% solution of Iron Blue (C. I. Pigment Blue 27) in "Ebecryl" 584 | 3 |
| "B-66" (n-butylmethacrylate/methylmethacrylate copolymer, available from Rohm & Haas) | 2 |
| "Epi-Rez" 5014 (monofunctional epoxy, available from Celanese) | 3 |
| "ERL" 4221 (cycloaliphatic epoxy, available from Union Carbide) | 1 |
| Mixture of triaryl sulfonium hexafluoroantimonates (cationic initiator, synthesized according to preferred route described in U.S. S.N. 876,114 (Smith et. al., filed February 8, 1978), incorporated herein by reference) | 1.5 |

The acrylate copolymer and "Ebecryl" 584 are blended together after which the solution is heated to about 120°–135° C. for 2 to 4 hours with shaking. After solution is achieved, the mixture is then cooled to about 60° C. and the epoxides are added. After addition of "Irgacure" 651 and the triarylsulfonium hexafluoroantimonates, the mixture is heated until complete solution occurs. Thixotropic agent and Iron Blue color concentrate (40 wt. percent Iron Blue combined on three roll paint mill with "Ebecryl" 584) are dispersed into the mixture using a tri-homo paint mill.

The resulting 100% solids, photohardenable composition has a viscosity such that it may be applied to the copper surface of a copper-dielectric laminate by means of a No. 14 Meyer Bar to produce a resist pattern of approximately 25–40 microns thick on the copper surface. The laminate had been previously cleaned using "Shipley Scrub Cleaner 11", water and a "Scotchbrite" pad (available from 3M Co.). The resist coating is then hardened by exposure to a 200 watt per inch medium pressure mercury vapor lamp in an ∂Ashdee" UV Processor (approximately 4–6 inches from the lamp for a time of approximately 3–5 seconds).

Table 1 contains results of adhesion testing as well as determinations of time required for disaggregation in methylene chloride for the above composition, for a composition not containing epoxides or cationic initiator, and for a composition not containing epoxides, cationic initiator or organic polymeric binder.

TABLE 1

| | % Loss of Adhesion[2] | | | Disaggregation in $CH_2CL_2$ (seconds)[3] | | |
|---|---|---|---|---|---|---|
| Cure[1] | Complete Composition | Composition not containing epoxides or cationic initiator | Composition not containing epoxides, cationic initiator or organic polymeric binder | Complete composition | Composition not containing epoxides or cationic initiator | Composition not containing epoxides, cationic initiator or organic polymeric binder |
| 1x | 0 | 0 | 100 | 6/21 | 10/29 | 14/28 |
| 2x | 0 | 0 | 80 | 5/15 | 11/24 | 31/81 |
| 3x | 0 | 0 | 80 | 13/26 | 45/greater than 120 | 95/greater than 120 |

[1]represents number of passes under UV lamps at 10 ft/min.
[2]measured by the ASTM Standard Methods Test entitled "Measuring Adhesion by Tape Test" (Designation: D3359-74)
[3]time in seconds for cold methylene chloride attack on 1 square inch of resist coating. First number indicates that time elapsed prior to onset of disaggregation of coating and the second indicates total time elapsed prior to completion of disaggregation of coating.

The beneficial effect of epoxides in the compositions in regards to the rate at which the cured composition disaggregates when exposed to methylene chloride is readily apparent from the above results.

The composition may be applied to the same copper-dielectric laminate discussed above with a stainless steel screen containing a fine-line pattern and it is often desirable to add an antifoam agent to the composition prior to screening. The resist pattern is hardened as described above.

The copper-dielectric laminate, with hardened resist pattern on portions of the copper surfaces, is placed on a conveyor belt and passed through a warm (i.e. 50° C.) spray of an alkaline etchant ("Continue Etch," available from McDermid) for approximately one minute. The resulting etched laminate is then rinsed with water and dried. The hardened resist pattern is then removed by placing the laminate on a conveyor belt which is passed through a methylene chloride spray. The end product obtained is a fine copper pattern on the dielectric.

EXAMPLE 2

A suitable photohardenable, liquid composition is prepared using the following ingredients:

|  | Parts |
| --- | --- |
| "Ebecryl" 584 | 38 |
| Polyester 49001 ("Food Packaging" polyester resin available from duPont Corp.) | 2 |
| "Epi-Rez" 5014 | 1.5 |
| "ERL" 4221 | 0.5 |
| Mixture of triaryl sulfonium hexafluoroantimonates described in Example 1 | 1.5 |
| Benzophenone | 1.5 |
| "R-972" | 3 |
| 40% Iron Blue (C. I. Pigment Blue 27) in "Ebecryl" 584 | 3 |

The ingredients are blended together and the resulting composition is applied to a copper surface, exposed, and processed, all in accordance with the procedures of Example 1. A fine copper pattern on the dielectric is obtained.

The cured material adheres well to the copper substrate and disaggregates rapidly as particles upon exposure to methylene chloride.

EXAMPLE 3

A suitable photohardenable, liquid composition is prepared using the following ingredients:

|  | Parts |
| --- | --- |
| "Ebecryl" 584 | 34 |
| "Elvacite" 2013 (acrylic resin, avaiable from DuPont) | 3 |
| "Epi-Rez" 5014 | 6 |
| "ERL" 4221 | 2 |
| Mixture of triaryl sulfonium hexafluoroantimonates described in Example 1 | 1.5 |
| "Irgacure" 651 | 0.75 |
| "M-5" Cab-O-Sil (thixotropic agent, available from Cabot Corp.) | 0.75 |
| "R-972" | 0.75 |
| "CP-1608" (40% Milori Blue in "ERL" 4221, available Worum Chemical Co.) | 3 |

The ingredients are blended together and the resulting composition is applied to a copper surface, exposed, and processed, all in accordance with the procedures of Example 1. A fine copper pattern on the dielectric is obtained.

The cured material adheres well to the copper substrate and disaggregates rapidly as particles upon exposure to methylene chloride.

EXAMPLE 4

Suitable photohardenable liquid compositions are prepared which comprise halogenated oligomeric esters synthesized using the following compounds (see Table 2) in the amounts indicated (in moles):

TABLE 2

| | Halogenated Oligomeric Ester | | | | | | | |
| --- | --- | --- | --- | --- | --- | --- | --- | --- |
| | 1 | 2 | 3 | 4 | 5 | 6 | 7 | 8 |
| ethylene glycol | 0.6 | 0.78 | 0.6 | 0.7 | 0.6 | 0.6 | | 0.68 |
| diethylene glycol | 0.3 | 0.26 | 0.3 | 0.35 | 0.3 | 0.3 | 0.3 | 0.34 |
| neopentyl glycol | | | | | | | 0.6 | |
| tetrachlorophthalic anhydride | 0.7 | 0.6 | 0.7 | 0.3 | 0.7 | 0.7 | 0.7 | |
| Hexachloroendomethylene tetrahydrophthalic acid | | | | 0.3 | | | | 0.552 |
| phthalic anhydride | 0.1 | 0.2 | 0.1 | 0.2 | 0.1 | 0.1 | 0.1 | 0.432 |
| Adipic acid | 0.1 | 0.2 | | | 0.1 | 0.1 | 0.1 | |
| Azelaic acid | | | 0.1 | 0.2 | | | | |
| benzoic acid | 0.05 | | 0.05 | | 0.05 | | 0.05 | |
| Time of reaction | 16 | 8.5 | 12 | 10 | 5.5 | 4.5 | 14 | 5.5 |
| % reaction | 100 | 96.4 | 92.1 | 87.6 | 72 | 78.3 | 81 | 78 |

The glycols are added to a 3-neck round bottom flask fitted with a mechanical stirrer, dipping thermometer and Barrett trap and condensor. Acids and anhydrides are then added with stirring and the mixture is then heated to 100°–130° C. Cyclohexane is added to the reaction mixture to entrain water produced in the esterification. Care must be taken when adding the cyclohexane so as not to depress the reaction temperature below about 100° C. As the reaction proceeds, the temperature is allowed to rise slowly to about 140°–150° C. Reaction times are indicated in the previous table. Upon termination of the reaction, cyclohexane is removed under vacuum while the mixture is slowly stirred. The clear product is decanted and is dissolved in 1,6-hexanediol diacrylate to give a solution which is 60% halogenated oligomeric ester by weight. For purposes of this Example, sufficient "Irgacure" 651 is then added to this solution with heating to 60° C. to give a solution which is 5% catalyst by weight.

The complete photohardenable, liquid composition is then prepared by using the following ingredients:

|  | Parts |
| --- | --- |
| Solution of 60% halogenated oligomeric ester and 5% "Irgacure" 651 in 1,6-hexanediol diacrylate) | 56 |
| "B-66" | 2 |
| "Epi-Rez" 5014 | 6 |

-continued

| | Parts |
|---|---|
| "ERL" 4221 | 2 |
| Mixture of triaryl sulfonium hexa-fluoroantimonates described in Example 1 | 1.5 |
| "R-972" | 1 |
| 40% Iron Blue (C.I. Pigment Blue 27) in Ebecryl 584) | 1.5 |

The ingredients are blended together and the resulting composition is applied to a copper surface, exposed and processed all in accordance with the procedures of Example 1. A fine copper pattern on the dielectric is obtained.

The various photohardenable compositions were tested upon curing for loss of adhesion and for time required for removal from copper substrate when exposed to methylene chloride. Compositions containing only the halogenated oligomeric ester and "Irgacure 651" in 1,6-hexanediol diacrylate were also studied. Studies relating to a composition containing "Ebecryl" 584 and "Irgacure" 651 and a composition containing "Ebecryl" 584, "Irgacure" 651 and the other constituents referred to above is included for reference. Results appear in Table 3 below. Testing procedures were those described in Example 1. Cure was effected with three passes of the coated dielectric under the lamp described in Example 1.

TABLE 3

| | Adhesion % Loss | | $CH_2CL_2$ (sec) | | Form Upon Removal | |
|---|---|---|---|---|---|---|
| Halogenated Oligomeric Ester Used | Complete Composition | Halogenated Oligomeric Ester and "Irgacure" 651 in 1,6-Hexanediol Diacrylate | Complete Composition | Halogenated Oligomeric Ester and "Irgacure" 651 in 1,6-Hexanediol Diacrylate | Complete Composition | Halogenated Oligomeric Ester and "Irgacure" 651 in 1,6-Hexanediol Diacrylate |
| "Ebecryl" 584 | 0 | 100 | 20/35 | 30/65 | particles | particles |
| 1 | 15 | 50 | 9/16 | 30/58 | particles | particles |
| 2 | 0 | 100 | 8/15 | 26/38 | particles | particles |
| 3 | 0 | 40 | 5/8 | 27/49 | particles | particles |
| 4 | 0 | 0 | 3/5 | 46/70 | particles | particles |
| 5 | 0 | 0 | 6/12 | 45/75 | particles | film |
| 6 | 0 | 0 | 10/30 | 18/38 | particles | film |
| 7 | 0 | 0 | 4/7 | 7/15 | particles | film |
| 8 | 0 | 0 | 3/7 | 9/13 | particles | film |

Thus it is apparent that use of these various halogenated oligomeric esters in combination with the polyacrylate, epoxide and cationic initiator results in photohardenable compositions which, when cured, adhere well to a copper substrate and which disaggregate rapidly as particles upon exposure to methylene chloride.

What is claimed is:

1. A photohardenable composition comprising:
   (a) about 10 to 80 weight percent of a halogenated oligomeric ester having a molecular weight of less than about 10,000 and a content of halogen attached to carbon of an $sp^2$ electronic configuration of about 19 to 55 weight percent;
   (b) about 10 to 80 weight percent of an acrylate or methacrylate monomer compatible with (a);
   (c) about 0.2 to 10 weight percent of a free radical generating initiator activatible by actinic light or electron beam irradiation;
   (d) about 2 to 20 weight percent of a compound having an average epoxide functionality of about 1 to 1.8;
   (e) about 1 to 10 weight percent of a cationic initiator activatible by actinic light or electron beam irradiation.

2. A photohardenable composition in accordance with claim 1, wherein said halogenated oligomeric ester contains chlorine as the halogen substituent and has a content of chlorine attached to carbon of an $sp^2$ electronic configuration of about 25 to 44 weight percent.

3. A photohardenable composition in accordance with claim 1, wherein said halogenated oligomeric ester contains chlorine and bromine as the halogen substituents and has a content of chlorine and bromine attached to carbon of an $sp^2$ electronic configuration of about 25 to 53 weight percent.

4. A photohardenable composition in accordance with claim 1, wherein said halogenatic oligomeric ester comprises halogenated acid, nonhalogenated acid and nonhalogenated alcohol components.

5. A photohardenable composition in accordance with claim 4, wherein said halogenated acid component is selected from the group consisting of tetrachlorophthalic anhydride, hexachloroendomethylene tetrahydrophthalic acid and tetrabromophthalic anhydride.

6. A photohardenable composition in accordance with claim 4, wherein the nonhalogenated acid component is selected from the group consisting of phthalic anhydride, phthalic acid, adipic acid, azelaic acid, benzoic acid and sebacic acid.

7. A photohardenable composition in accordance with claim 3, wherein the nonhalogenated alcohol component is selected from the group consisting of ethylene glycol, diethylene glycol, propylene glycol, dipropylene glycol, neopentyl glycol, tripropylene glycol, triethylene glycol and tetraethylene glycol.

8. A photohardenable composition in accordance with claim 1, wherein said composition comprises about 35 to 65 weight percent of a halogenated oligomeric ester.

9. A photohardenable composition in accordance with claim 1, wherein said acrylate or methacrylate monomer is selected from the group consisting of 1,6-hexanediol diacrylate, tetraethylene glycol diacrylate, 1,4-butanediol diacrylate, 1,4-butanediol dimethacrylate, diethylene glycol diacrylate, diethylene glycol dimethacrylate, ethylene glycol diacrylate and ethylene glycol dimethacrylate.

10. A photohardenable composition in accordance with claim 1, wherein said acrylate or methacrylate monomer comprises about 20 to 37 weight percent of said composition.

11. A photohardenable composition in accordance with claim 1, wherein said free-radical generating system is selected from the group consisting of diethoxyacetophenone, 2,2-dimethoxy-2-phenylacetophenone, 2-chlorothioxanthone, fluorescein, benzoin methylether, benzoin ethylether, t-butyl anthraquinone and benzophenone.

12. A photohardenable composition in accordance with claim 1, wherein said epoxide is selected from the group consisting of glycidyl ether of p-tertiarybutylphenol and 3,4-epoxycyclohexylmethyl-3,4-epoxycyclohexane carboxylate.

13. A photohardenable composition in accordance with claim 1, wherein said cationic initiator is selected from the group consisting of $\phi S\phi S(\phi)_2 SbF_6$ (where $\phi$=phenyl), triphenylsulfonium hexafluoroantimonate, triphenylsulfonium hexafluoroantimonate, triphenylsulfonium tetrafluoroborate, triphenylsulfonium hexafluorophosphate, dimethylphenylsulfonium hexafluorophosphate and diphenyliodonium hexafluorophosphate.

14. A photohardenable composition in accordance with claim 1, wherein said composition further comprises up to about 25 weight percent of an organic polymeric binder soluble in said halogenated oligomeric ester and said acrylate or methacrylate monomer.

15. A photohardenable composition in accordance with claim 14, wherein said organic polymeric binder is selected from the group consisting of polymethyl methacrylate, polyester, methyl cellulose, ethyl cellulose, benzyl cellulose, cellulose acetate, cellulose acetate succinate, cellulose acetate butyrate, polyvinyl acetate, polyvinyl chloride, polyvinyl butyral, polyvinyl formal, polyurethanes, and copolymers of n-butylmethacrylate/methylmethacrylate, methylmethacrylate/n-butylmethacrylate/hydroxyethylmethacrylate, methylmethacrylate/n-butylmethacrylate/glycidylmethacrylate, vinylidene chloride/methacrylate vinylidene chloride/vinyl acetate, polyvinyl acetate/acrylate, polyvinyl acetate/methacrylate, polyvinyl chloride/acetate, styrene/butadiene and ethylene/vinyl acetate.

16. A photohardenable composition in accordance with claim 14, wherein said organic polymeric binder comprises about 2 to 10 weight percent of said composition.

17. The photohardenable composition in accordance with claim 1, said composition further containing up to 40 weight percent of filler.

* * * * *